June 29, 1937.  F. R. BICHOWSKY ET AL  2,084,997
REFRIGERATING APPARATUS
Filed Feb. 25, 1935  5 Sheets-Sheet 2

June 29, 1937.   F. R. BICHOWSKY ET AL   2,084,997
REFRIGERATING APPARATUS
Filed Feb. 25, 1935   5 Sheets-Sheet 3

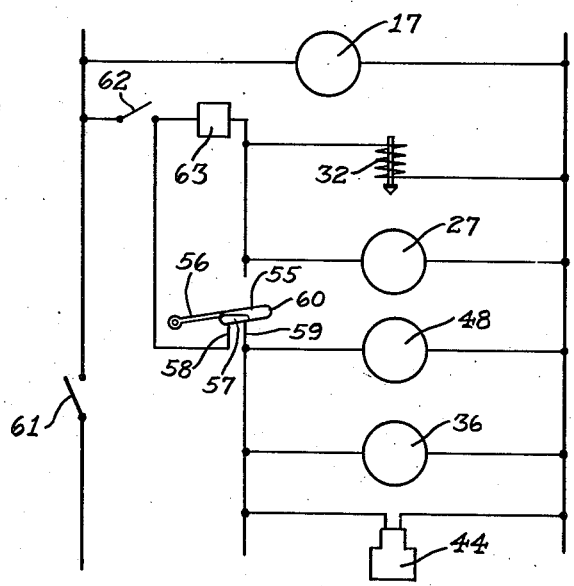
*Fig.* 5
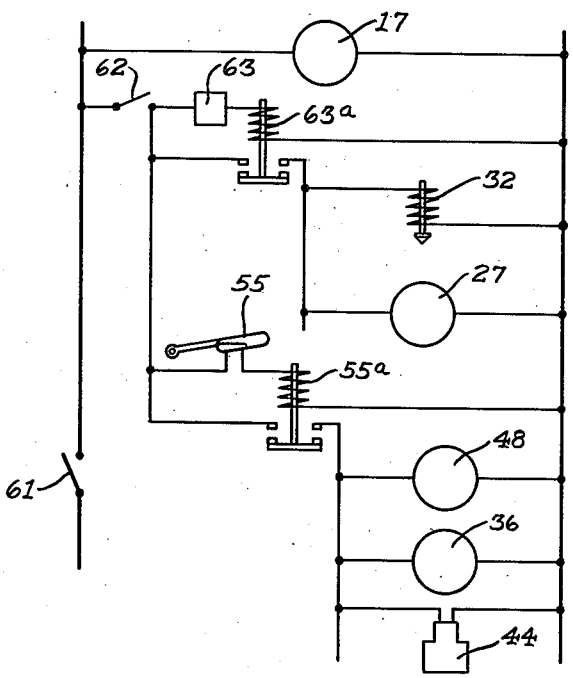
*Fig.* 6

Patented June 29, 1937

2,084,997

UNITED STATES PATENT OFFICE 2,084,997

REFRIGERATING APPARATUS

Francis R. Bichowsky, Ottawa Hills, and Gilbert A. Kelley, Toledo, Ohio, assignors to General Motors Corporation, Dayton, Ohio, a corporation of Delaware Application February 25, 1935, Serial No. 7,974

15 Claims. (Cl. 183—121)

This invention relates to the conditioning of air.

It is an object of this invention to provide an improved method and apparatus for conditioning air by the use of an air modifying liquid.

Further objects and advantages of the present invention will be apparent from the following description, reference being had to the accompanying drawings, wherein a preferred form of the present invention is clearly shown.

In the drawings:

Fig. 5 is a wiring diagram of the apparatus; and

Fig. 6 is a wiring diagram of the apparatus showing a modification.

Figure 1:
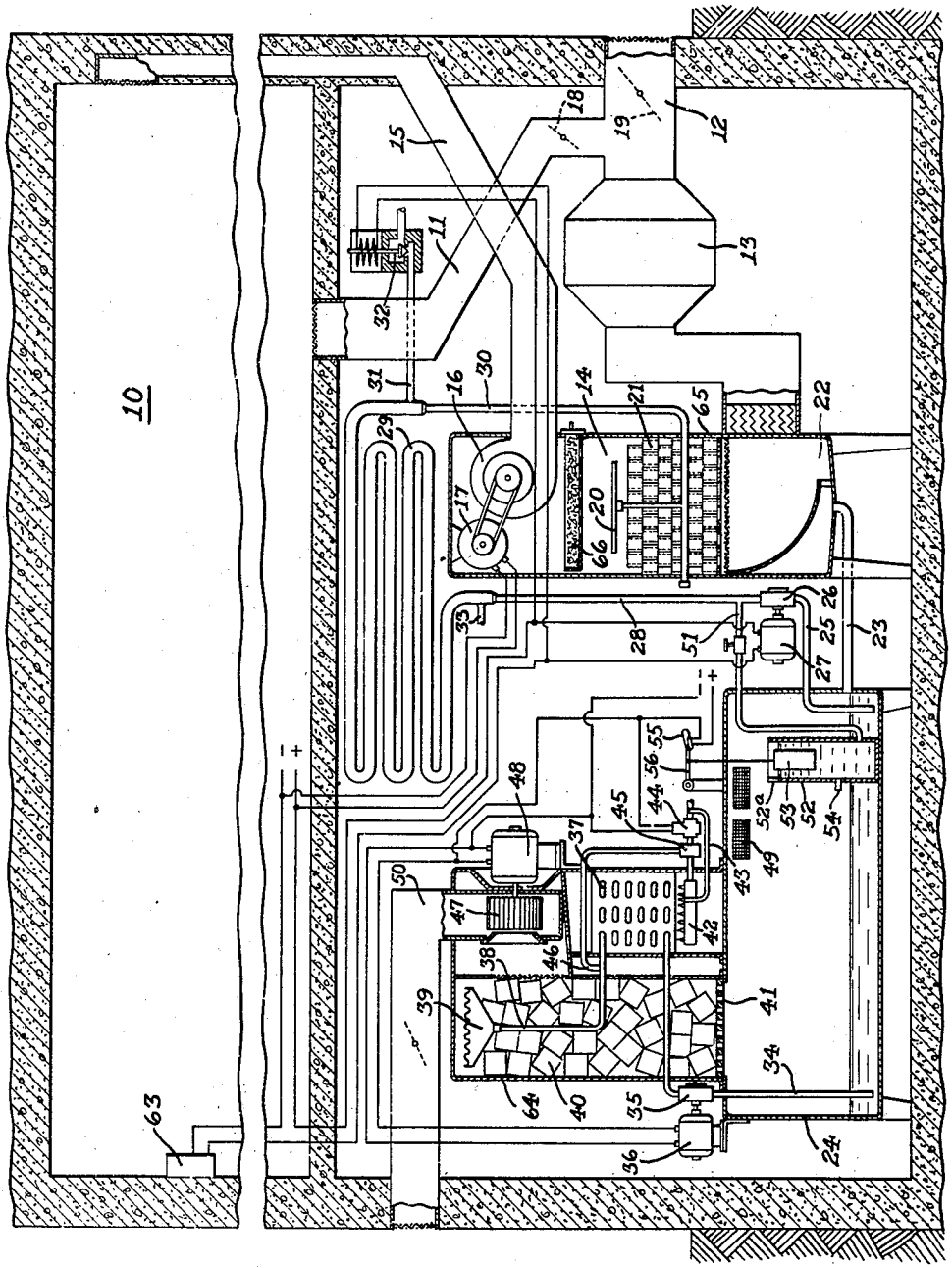
Fig. 1 is a view somewhat diagrammatic and partly in cross-section showing an embodiment of the invention.
Figure 2:
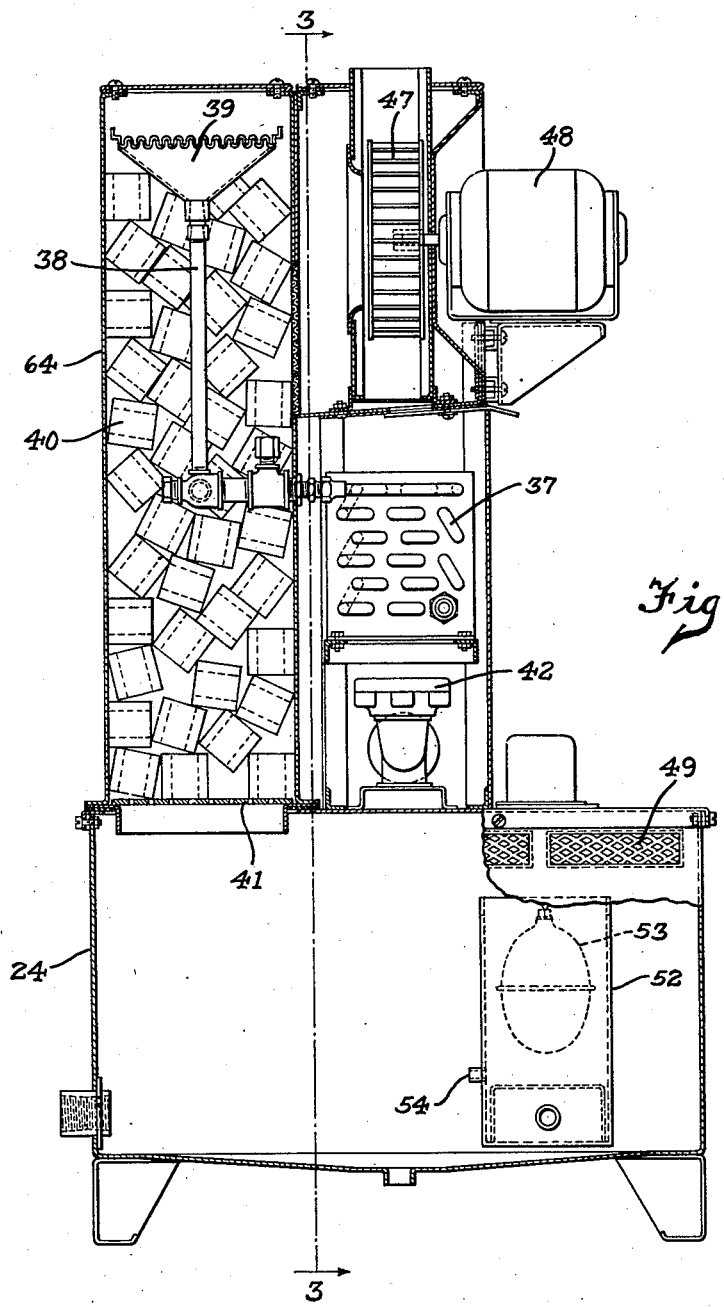
Fig. 2 is a vertical cross-sectional view showing a portion of the apparatus of Fig. 1 on an enlarged scale.
Figure 3:
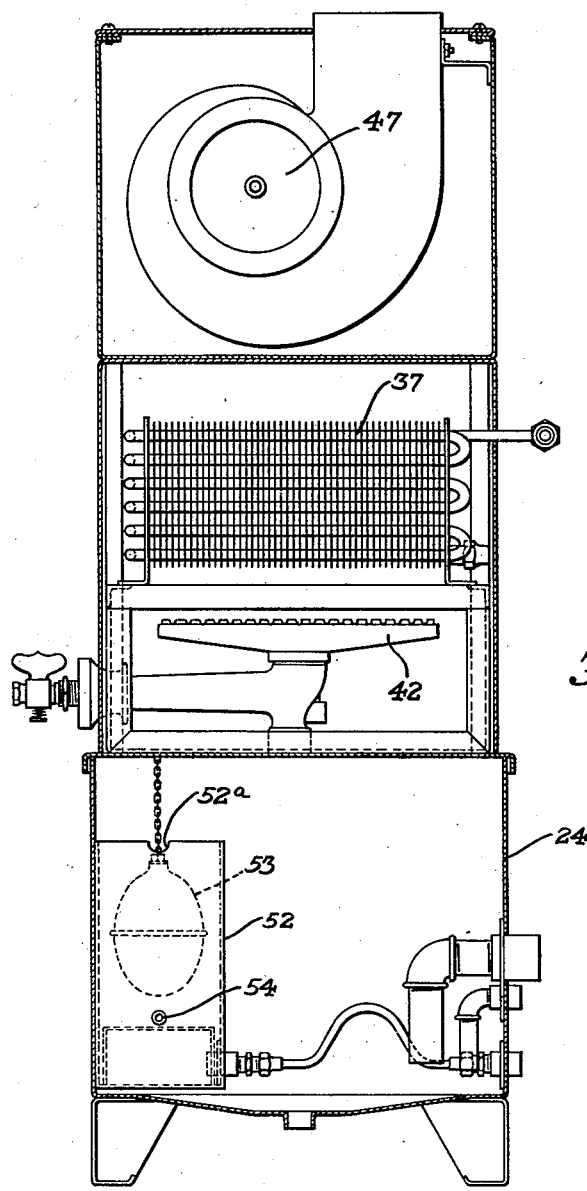
Fig. 3 is a view taken along the line 3—3 of Fig. 2.
Figure 4:
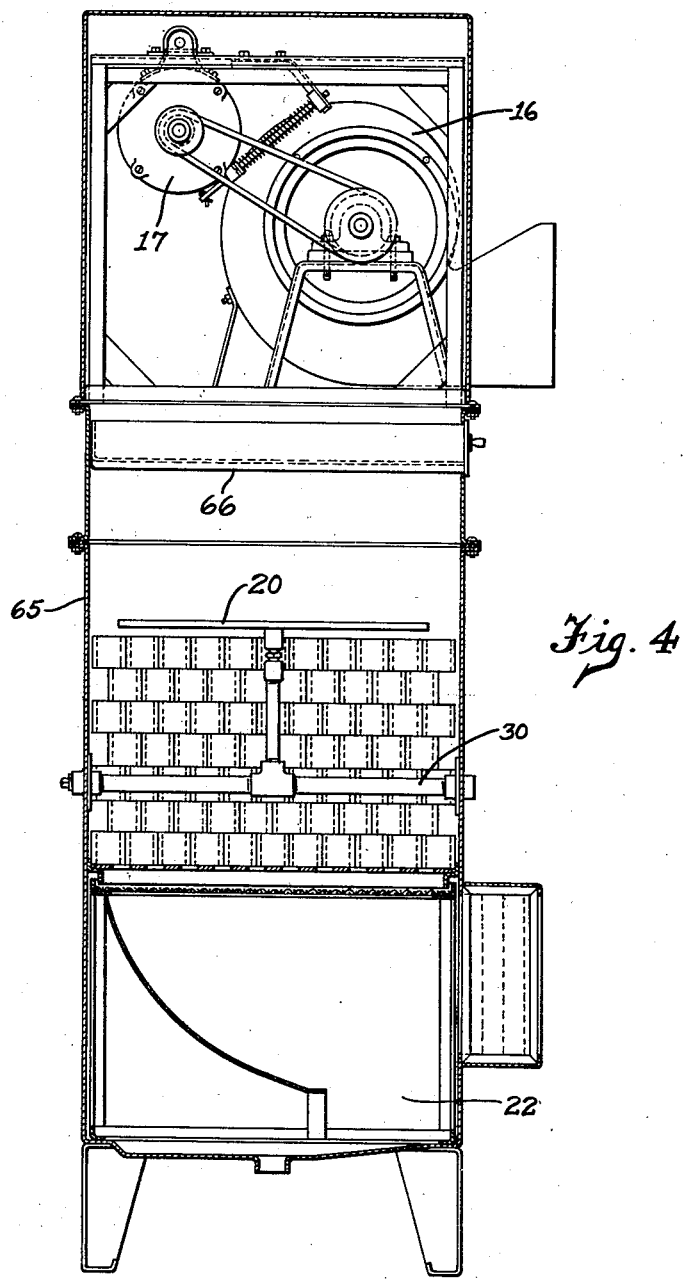
Fig. 4 is an enlarged view of the air drying portion of the apparatus shown in Fig. 1.

In practicing this invention air is conditioned by bringing it in contact with a drying medium of desired temperature and drying power and is delivered to the space to be conditioned. In the embodiment shown in Fig. 1, the air to be conditioned is delivered to the enclosure 10. The air to be conditioned may come either from the enclosure 10 through the pipe 11, or from outside the enclosure 10 through the pipe 12, the air passing through a filter 13 and entering a drying tower or conditioning zone 14 from whence it is delivered to the enclosure 10 through a conduit 15 by means of the fan 16 driven by the motor 17. The air to be conditioned may also come partly from the enclosure 10 and partly from outside the enclosure. Valves 18 and 19 determine the proportions of air entering the conditioner either from the outside or inside of the enclosure 10.

The air passing in a stream through the conditioning zone 14 is preferably brought into contact with a drying solution, the solution preferably including water as a solvent and one of the lithium salts or chemical compounds having a hygroscopic characteristic of the soluble lithium halide group as a solute. Such solutions are disclosed in the copending application Serial No. 560,362, filed August 31, 1931, the soluble lithium halide group disclosed being the lithium chloride, bromide and iodide. The solution is discharged into the zone 14 by the distributing head 20 and trickles through the contact mass 21 and is gathered in the sump 22 from which a portion flows through the pipe 23 to the reactivator sump 24. The main body of solution in the bottom of the sump 24 feeds two streams of drying medium. One stream flows through intake 25 of pump 26 driven by motor 27 and through pipe 28 to a heat interchanger 29 from whence it flows through the pipe 30 to the distributing head 20. The heat interchanger 29 may be connected to any source of cooling fluid entering, for example, through the pipe 31 under the control of a solenoid valve 32. The cooling medium may be ordinary city water at ordinary temperatures, although it is to be understood that, if desired, this cooling medium may be brine, volatile refrigerant or any other fluid adapted to cool the solution; and it may be automatically maintained at any desired temperature by any of the well-known methods. The cooling fluid leaves the heat interchanger 29 at 33.

Another stream of solution flows from the sump 24 through the pipe 34, pump 35, driven by motor 36, to a tube heater 37 from whence the hot liquid is discharged through the pipe 38 to the distributing head 39 and is allowed to trickle through the contact mass 40 back into the sump 24 through the perforated bottom plate 41. A heater 37 may be provided with a fuel burner 42, in this particular embodiment being a gas burner provided with a pilot 43, solenoid valve 44 and a thermostatic valve 45. The valve 45 controls the burner 42 in accordance with the temperature of the solution at the outlet of the header as indicated at 46. The hot solution flowing through the contact mass 40 is brought into contact with air so that the solution is concentrated and cooled simultaneously. This may be accomplished by providing a fan 47 driven by motor 48, the fan causing air to flow through the inlets 49 and through the plate 41 and mass 40, through the fan 47 and pipe 50 to the exterior of the building.

Automatic controls are provided. In order to control the concentration of the drying liquid, the heating action of the heater 37, the circulation by fan 47 and the pumping by pump 35 are controlled in accordance with the concentration of the solution. For example, a branch pipe 51 is connected to the pipe 28 and discharges into a cup 52 in which the hydrometer 53 is located. A slow drain 54 is placed in the cup 52 which has a flow capacity much less than the flow capacity of the pipe 51. The excess solution overflows from the cup at 52a. The hydrometer 53 controls the movement of a mercury tube switch 55 mounted on an arm 56. The liquid in cup 52 is thus representative of the liquid in sump 24. As the concentration of the liquid proceeds the hydrometer 53 rises and this causes the mercury drop 57 to open contacts 58 and 59. The action of the burner 42, fan 47 and pump 35 is then stopped or modulated to stop or decrease the concentrating action until such time as the hydrometer 53 lowers into the liquid in response to dilution thereof, the mercury drop 57 bridges the contacts 58 and 59 and starts the operation or increases the operation of the burner 42, fan 47 and pump 35 to resume or increase the concentrating action. If for any reason the action of the pump 26 should cease, either by reason of the automatic control or because of a manual control or because of some accidental interruption, the liquid in cup 52 will slowly drain through opening 54 and the hydrometer 53 will lower the arm 56 to such an extent that the mercury bulb 57 will break the contacts 58 and 59 by having the drop 57 flow to the end 60 of the mercury tube. When this occurs the concentrating action is stopped until such a time as the pump 26 resumes its operation and fills the cup 52. It is to be understood that the hydrometer 53 may be placed in the main body of liquid in sump 24, if desired.

A master switch 61 (Fig. 5) may be provided which controls the operation of the entire system. When this switch is closed the motor 17 is placed in operation and air may be circulated in the compartment 10 without any drying action. If the drying action also is desired, the sub-master switch 62 is closed and this places the solenoid valve 32 and the motor 27 which drives the pump 20 under the control of the automatic switch 63 placed in a position to be responsive to conditioned air. At the same time, the closing of switch 62 places the fan motor 48, pump motor 36 and solenoid valve 44 under the control of the mercury switch 55 as more clearly indicated in Fig. 5.

In Fig. 6 substantially the same wiring diagram is used except that the switches control relays which in turn energize the various parts of the apparatus. Switch 63 controls relay 63a which in turn controls valve 32 and motor 27. Switch 55 controls relay 55a which in turn controls motors 36 and 48 and valve 44.

The automatic switch 63 may be of any type desired. It may be a thermostatic switch responsive either to dry bulb or to wet bulb temperatures or both. It may be a humidistat responsive to the relative humidity. The switch 63 may be placed where it is responsive to the condition of air under treatment. Thus it may be placed in the enclosure 10 or in the duct 11, 12 or 13 as desired.

For convenience the apparatus disclosed is made in unitary structures capable of quick assemblies at the place of use. Thus the sump 24 supports the tower 64 together with the heater 37, motors 36 and 48 and pump 35 and blower 47 and forms the concentrator. The motor 27 and pump 26 may be mounted either on the sump 24 or on the tower 65 which, for convenience, is made as a separate unit from the concentrator. The tower 65 may carry in addition to the motor 27 and pump 26, the blower 16, motor 17, contact mass 21 and if desired a filter 66. The interchanger 29 may be a separate structure or it may be carried by the tower 65. These unitary structures are so arranged that they may be set up at the place of use and may be connected with pipes and conduits for the flow of the liquids and the air at the place of use. The contact masses may be shipped separately from the casings.

While the form of embodiment of the invention as herein disclosed, constitutes a preferred form, it is to be understood that other forms might be adopted, all coming within the scope of the claims which follow.

What is claimed is as follows:

1. Conditioning apparatus comprising a casing forming a concentrator sump, a contact tower on said casing, a heater on said casing, a pump on said casing, liquid flow connections from said sump through said pump, heater, contact tower back to said sump, an automatic control responsive to the conditions of the liquid in said sump controlling the operation of said pump including a cup, connections for the circulation of liquid from said sump to said cup, a switch control for said pump having a float in said cup, and a slow drain from said cup below the normal level of liquid in said cup.

2. Conditioning apparatus comprising a casing forming a concentrator sump, a contact tower on said casing, a heater on said casing, a pump on said casing, liquid flow connections from said sump through said pump, heater, contact tower back to said sump, an automatic control responsive to the conditions of the liquid in said sump controlling the operation of said heater including a cup, connections for the circulation of liquid from said sump to said cup, a switch control for said heater having a float in said cup, and a slow drain from said cup below the normal level of liquid in said cup.

3. Conditioning apparatus comprising a casing forming a concentrator sump, a contact tower on said casing, a heater on said casing, a pump on said casing, liquid flow connections from said sump through said pump, heater, contact tower back to said sump, an automatic control responsive to the conditions of the liquid in said sump controlling the operation of said pump and heater including a cup, connections for the circulation of liquid from said sump to said cup, a switch control for said pump and heater having a float in said cup, and a slow drain from said cup below the normal level of liquid in said cup.

4. Conditioning apparatus comprising a casing forming a concentrator sump, a contact tower on said casing having a blower, a heater on said casing, a pump on said casing, liquid flow connections from said sump through said pump, heater, contact tower back to said sump, an automatic control responsive to the conditions of the liquid in said sump controlling the operation of said pump, heater and blower including a cup, connections for the circulation of liquid from said sump to said cup, a switch control for said pump, heater and blower having a float in said cup, and a slow drain from said cup below the normal level of liquid in said cup.

5. Conditioning apparatus comprising a concentrator having a sump, a control for said concentrator including a cup, means for circulating liquid from said sump to said cup, a hydrometer in said cup controlling said concentrator, and a slow drain from said cup of less capacity than said means whereby said cup is maintained in its normal full condition while said means operates and is maintained below its normal full condition when said means stops.

6. Conditioning appaartus comprising a concentrator having a sump, a control for said concentrator including a cup, means for circulating liquid from said sump to said cup, a hydrometer float in said cup provided with a switch causing operation of said concentrator as said float rises and stopping operation of said concentrator as said float falls, a slow drain from said cup whereby said float controls said concentrator in accordance with liquid conditions and stops said concentrator when said means alters its circulation of liquid into said cup.

7. Conditioning apparatus comprising means forming a flow path for a hygroscopic liquid, and including a concentrator therefor, a conditioning chamber, flow means for said liquid to the conditioning chamber and the concentrator, and means responsive to the flow and concentration of the liquid in the flow means for regulating the concentrator and modulating the operation of the concentrator with a change of flow of the liquid.

8. In combination with conditioning apparatus having means forming a flow path for a hygroscopic liquid in which said liquid is circulated to an air contacting apparatus and a concentration unit, control means therefor comprising a cup, means for pumping hygroscopic liquid therein, means for maintaining a plurality of liquid levels in said cup and means responsive to the hydrometric condition of the liquid therein and the liquid level therein controlling the concentration unit.

9. Conditioning apparatus comprising a concentrator, a control for said concentrator including a cup, means for circulating liquid to said cup, a hydrometer in said cup controlling said concentrator, a slow drain from said cup of less capacity than said means whereby said cup is maintained in its normal full condition while said means operates and is maintained below its normal full condition when said means stops, and means operated by said hydrometer whereby a control circuit is opened in the uppermost and lowermost positions of said hydrometer and closed in an intermediate position.

10. Conditioning apparatus comprising a concentrator, a control for said concentrator including a cup, means for circulating liquid to said cup, a hydrometer in said cup controlling said concentrator, and a slow drain from said cup of less capacity than said means whereby said cup is maintained in its normal full condition while said means operates and is maintained below its normal full condition when said means stops.

11. Conditioning apparatus comprising a sump, a concentrator contact tower having a heater, a conditioning tower, means for circulating liquid from said sump through said heater and concentrator contact tower back to said sump and from said sump through said conditioning tower back to said sump, means for controlling the flow of liquid to said conditioning tower, means controlling the operation of said concentrator contact tower in accordance with the concentration of liquid in said sump, and modulating the concentrating action of said concentrator contact tower when the flow of liquid to said conditioning tower is modified.

12. Conditioning apparatus comprising a sump, a concentrator contact tower having a heater, a conditioning tower, means for circulating liquid from said sump through said heater and concentrator contact tower back to said sump and from said sump through said conditioning tower back to said sump, means starting and stopping the flow of liquid to said conditioning tower in accordance with conditions in a space to be conditioned, and means controlling the operation of said concentrator contact tower in accordance with the concentration of liquid in said sump and stopping the operation of said concentrator contact tower when the flow of liquid to said conditioning tower is stopped.

13. The method of conditioning air which comprises maintaining a body of hygroscopic liquid, flowing liquid from said body through a concentrating zone and back to said body and through a conditioning zone back to said body, controlling the flow of liquid to said conditioning zone in accordance with hygroscopic conditions in conditioned air and controlling the operation of said concentrating zone in accordance with the flow of liquid to said conditioning zone and in accordance with the concentration of liquid in said body.

14. Conditioning apparatus comprising a casing forming a sump, a concentrator contact tower having a heater, a conditioning tower, pumping means circulating liquid from said sump through said heater and concentrator contact tower back to said sump and through said conditioning tower back to said sump, a cup, connections for circulation of liquid from said sump to said cup, slow drain provisions from said cup providing full and drained conditions in said cup, a hydrometer float in said cup, and switch means responsive to the concentration of liquid in said cup while in full condition to control the concentrating effect of said concentrator contact tower and while in drained condition to stop the concentrating effect of said concentrator contact tower.

15. The method of conditioning air which comprises maintaining a body of hygroscopic liquid, flowing liquid from said body through a concentrating zone and back to said body and through a conditioning zone back to said body, controlling the flow of liquid to said conditioning zone in accordance with hygroscopic conditions in conditioned air, and controlling the operation of said concentrating zone in accordance with the concentration of the liquid in said body and in such a manner as to prevent commencement of the concentrating operation in the concentrating zone while said conditioning zone is idle.

FRANCIS R. BICHOWSKY.
GILBERT A. KELLEY.